(12) United States Patent
Lee

(10) Patent No.: US 10,852,807 B2
(45) Date of Patent: Dec. 1, 2020

(54) HYBRID POWERING OFF OF STORAGE COMPONENT MEMORY CELLS

(71) Applicant: Microsoft Technology Licensing, LLC, Redmond, WA (US)

(72) Inventor: Yongjoon Lee, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 15/886,665

(22) Filed: Feb. 1, 2018

(65) Prior Publication Data

US 2019/0235606 A1  Aug. 1, 2019

(51) Int. Cl.
*G06F 1/32* (2019.01)
*G06F 1/3246* (2019.01)
*G06F 1/3234* (2019.01)
*G06F 1/3225* (2019.01)

(52) U.S. Cl.
CPC ........... *G06F 1/3246* (2013.01); *G06F 1/325* (2013.01); *G06F 1/3225* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 8,417,900 B1 * | 4/2013 | Perozo | G06F 1/3203 |
| | | | 711/154 |
| 9,001,572 B2 * | 4/2015 | Choi | G11C 5/14 |
| | | | 365/156 |
| 9,473,113 B1 | 10/2016 | Pant et al. | |
| 9,654,101 B2 | 5/2017 | Cao et al. | |
| 9,665,160 B1 | 5/2017 | Cao et al. | |
| 9,690,365 B2 | 6/2017 | Mair et al. | |
| 2002/0141238 A1 * | 10/2002 | Pasternak | G11C 5/14 |
| | | | 365/185.11 |

(Continued)

OTHER PUBLICATIONS

"Supporting PCIe and SATA BGA form factor for SSD's", PCI-SIG Engineering Change Request—M.2 Spec Rev 1.0, Feb. 25, 2015, 34 pages.

(Continued)

*Primary Examiner* — Zahid Choudhury
(74) *Attorney, Agent, or Firm* — Rainier Patents, P.S.

(57) ABSTRACT

A storage component includes multiple nonvolatile memory cells and a storage controller that manages the storage of data in and the retrieval of data from the memory cells. A computing device includes or is coupled to the storage component. A processor of the computing device provides a processor power enable signal to the storage component, allowing the processor to turn on and off power to the memory cells as the processor deems appropriate. The storage controller provides a storage controller power enable signal that allows the storage controller to turn on and off power to the memory cells as the storage controller deems appropriate. These power enable signals are inputs to a combinatorial logic component that allows the storage controller to have power to the memory cells turned off even though the processor may deem that power to the memory cells is to be turned on.

20 Claims, 7 Drawing Sheets

(56) References Cited

U.S. PATENT DOCUMENTS

| | | | |
|---|---|---|---|
| 2004/0121802 A1* | 6/2004 | Kim | H04M 1/72522 |
| | | | 455/556.2 |
| 2010/0231044 A1* | 9/2010 | Tatsumi | G06F 1/3203 |
| | | | 307/39 |
| 2010/0283791 A1* | 11/2010 | Lin | G06F 1/26 |
| | | | 345/522 |
| 2013/0097449 A1* | 4/2013 | Priel | G11C 7/20 |
| | | | 713/324 |
| 2013/0132740 A1* | 5/2013 | Li | G11C 16/30 |
| | | | 713/300 |
| 2013/0339761 A1* | 12/2013 | Abhishek | G06F 1/3287 |
| | | | 713/300 |
| 2014/0258750 A1* | 9/2014 | Tsai | G06F 1/26 |
| | | | 713/320 |
| 2014/0359336 A1* | 12/2014 | Chen | G06F 1/28 |
| | | | 713/330 |
| 2016/0306412 A1 | 10/2016 | Kolla et al. | |
| 2017/0177057 A1 | 6/2017 | Morning-Smith et al. | |
| 2018/0059756 A1* | 3/2018 | Gallimore | G06F 1/266 |
| 2019/0007031 A1* | 1/2019 | Kwon | H03K 19/0016 |

OTHER PUBLICATIONS

Rozic, et al., "Design Solutions for Securing SRAM Cell Against Power Analysis", In Proceedings of IEEE International Symposium on Hardware-Oriented Security and Trust, Jun. 3, 2012, 6 Pages.

* cited by examiner

HYBRID POWERING OFF OF STORAGE COMPONENT MEMORY CELLS

BACKGROUND

As technology has advanced, computers have become increasingly commonplace in our lives. For example, the functionality and processing power that used to be available only in desktop or server computers can now be had in a handheld mobile device. This improved mobility and functionality of computers has provided many benefits, but is not without its problems. One such problem is that these devices are typically powered by batteries, and draw power from their batteries as the devices are used. Unfortunately, poor power management in devices can result in short battery lives, leading to user frustration with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a storage component includes a plurality of memory cells, a storage controller, a combinatorial logic component, and a power switch. The storage controller has as an output a first power enable line, which can be an active low enable (which is an electrical low voltage or ground voltage) or an active high enable (which is an electrical high voltage). The combinatorial logic component is coupled to the storage controller and a processor, and has as inputs the first power enable line and a second power enable line from the processor, and has as an output a switch control line having a first state or a second state that is based on whether the first power enable line is asserted (active) and whether the second power enable line is asserted. The power switch is coupled to the combinatorial logic component, and has as an input an input power line and the switch control line, and has an output to provide power from the input power line to the plurality of memory cells in response to the switch control line having the first state, and to provide no power from the input power line to the plurality of memory cells in response to the switch control line having the second state.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Hybrid powering off of storage component memory cells is discussed herein. The storage component can be, for example, a solid state drive (SSD), an embedded multimedia card (eMMC), or a universal flash storage (UFS) device. The storage component includes multiple memory cells that can store data, and a storage controller that controls or manages the storage of data in and the retrieval of data from the memory cells. The memory cells include nonvolatile memory, allowing the memory cells to maintain data stored therein without requiring constant power supply to the memory cells.

A computing device includes or is coupled to the storage component. The computing device includes a processor (e.g., a standalone processor or a processor that is part of a system on a chip (SoC)) that reads data from and writes data to the storage component. The processor also provides a processor power enable signal to the storage component, which is used by the processor to turn on and off power to the memory cells as the processor deems appropriate.

The storage controller also provides a storage controller power enable signal that is used by the storage controller to turn on and off power to the memory cells as the storage controller deems appropriate. The processor power enable signal and the storage controller power enable signal are inputs to a logical component (e.g., a combinatorial logic component) that allows the storage controller to have power to the memory cells turned off even though the processor may deem that power to the memory cells is to be turned on. Thus, a hybrid approach to powering off the memory cells in the storage component is provided, with the powering off of the memory cells being based on both the processor power enable signal and the storage controller power enable signal.

The storage controller can thus effectively override a determination by the processor to power on the memory cells. The storage controller typically has more knowledge regarding the types of memory cells in the storage component, where data is stored in the storage component, whether access to the memory cells is needed (e.g., rather than accessing a cache memory of the storage controller), and so forth. This additional knowledge allows the storage controller to sometimes know that even though the processor desires to power on the memory cells, the memory cells can remain powered down, and thus the energy to power on the memory cells need not be expended.

Figure 1:
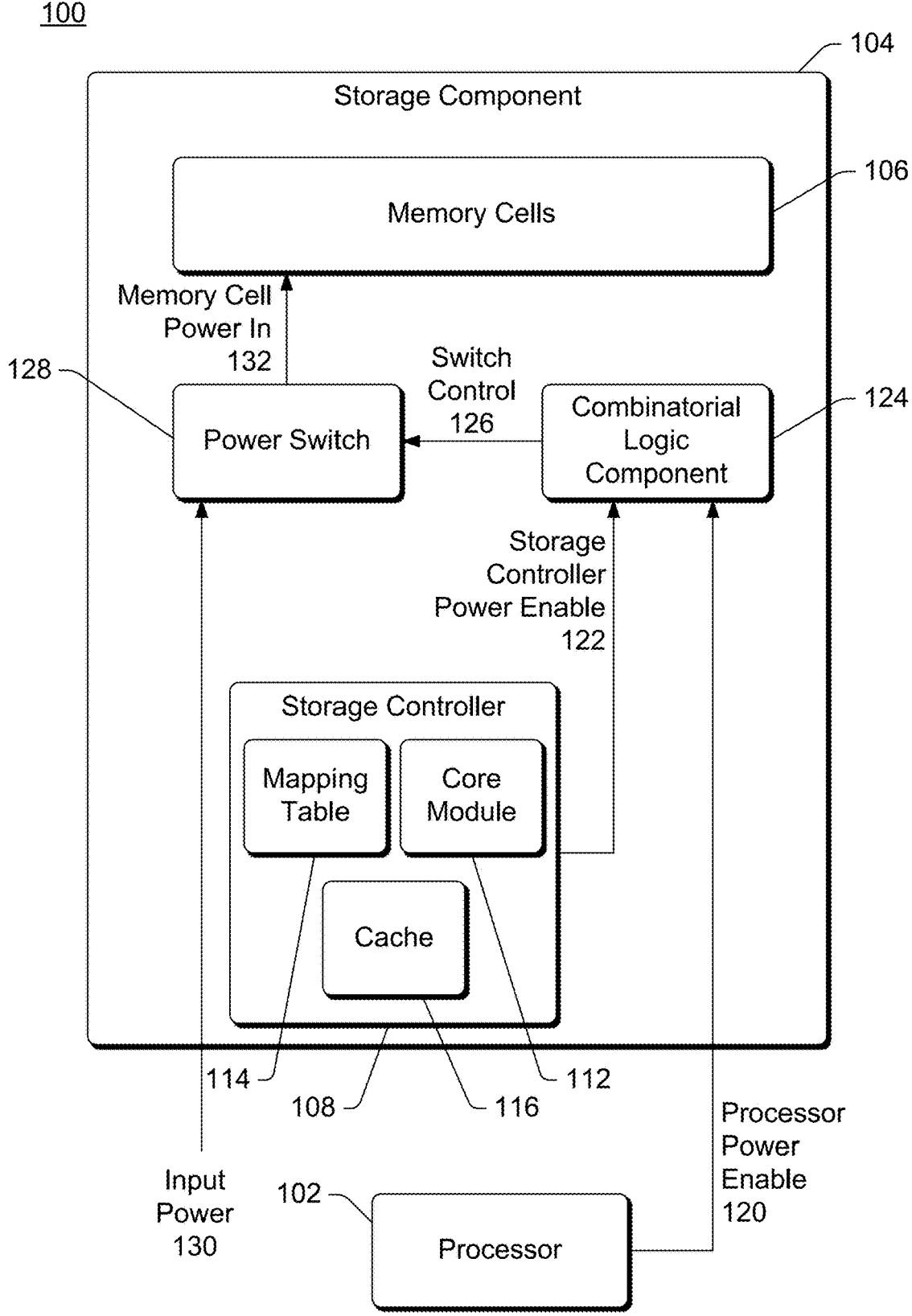
FIG. 1 illustrates an example system implementing the hybrid powering off of storage component memory cells in accordance with one or more embodiments.

FIG. 1 illustrates an example system 100 implementing the hybrid powering off of storage component memory cells in accordance with one or more embodiments. The system 100 includes a processor 102 and a storage component 104. The processor 102 and the storage component 104 can be included as parts of the same computing device, such as parts of the same mobile device (e.g., a laptop computer, a smartphone, a tablet, and so forth). Additionally or alternatively, the processor 102 and the storage component 104 can be parts of two separate devices. For example, the processor 102 can be included as part of a computing device (e.g., a laptop computer, a smartphone, a tablet, and so forth) and the storage component 104 can be included as part of an external storage device.

The system 100 can be implemented using any of a variety of different types of devices. For example, the system 100 can be implemented as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, augmented reality (AR) devices, virtual reality (VR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the system 100 can be implemented as a computing device ranging from full resource devices with substantial memory and processor resources (e.g., personal computers, game consoles) to low-resource devices with limited memory and/or processing resources (e.g., traditional set-top boxes, hand-held game consoles).

The processor 102 can be a standalone processor, such as a single chip that incorporates one or more processor cores. The processor 102 can also be part of a SoC that includes additional functionality on the same chip as the processor 102. For example, the SoC can include network communication functionality (e.g., hardware to connect the SoC to a wired or wireless network), peripheral device communication functionality (e.g., hardware to connect the SoC to a peripheral device such as via a universal serial bus (USB) connection), and so forth.

The device that includes the processor 102 can be any of a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, augmented reality (AR) devices, virtual reality (VR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the computing device that includes the processor 102 may range from a full resource device with substantial memory and processor resources (e.g., personal computers, game consoles) to a low-resource device with limited memory and/or processing resources (e.g., traditional set-top boxes, hand-held game consoles).

The storage component 104 includes multiple memory cells, illustrated as memory cells 106, and a storage controller 108. Each of these memory cells 106 can store data (e.g., 1 bit of data) and can be written to and read from by the storage controller 108. The memory cells 106 include nonvolatile memory cells that can be implemented using various different types of technology, such as NAND (negative-AND) gates or cells, NOR gates or cells, storage-class memory (SCM) gates or cells such as 3D Xpoint memory available from Intel Corporation of Santa Clara, Calif. or Micron Technology, Inc. of Boise, Id., combinations thereof, and so forth. The memory cells 106 can also optionally include volatile memory cells, such as dynamic random access memory (DRAM) as discussed in more detail below.

Regardless of the technology used to implement the memory cells 106, power is provided to the memory cells 106 in order to read data from and/or write data to the memory cells 106. Providing power to the memory cells 106 is also referred to as powering on or powering up the memory cells 106. While power is provided to the memory cells 106, the memory cells 106 are referred to as being powered on or powered up. Ceasing providing power to the memory cells 106 is also referred to as powering down or powering off the memory cells 106. While power is not provided to the memory cells 106, the memory cells 106 are referred to as being powered off or powered down. It should be noted that the nonvolatile memory cells 106 do not require power to maintain data stored in the memory cells 106—data stored in the memory cells 106 is maintained in the memory cells 106 even if no power is provided to the memory cells 106.

In some situations, the memory cells 106 also include volatile memory cells, such as DRAM. In such situations, the volatile memory cells are powered on when the storage controller 108 knows there is data stored in the volatile memory cells regardless of whether the nonvolatile memory cells are powered on or powered off. In one or more embodiments, separate memory cell power in lines can be provided to the memory cells 106, one for nonvolatile memory and one for volatile memory, as discussed in more detail below (e.g., with reference to FIG. 4).

The processor 102 makes a determination as to when the memory cells 106 are to be powered on and when the memory cells 106 are to be powered off. The processor 102 can make the determination in a variety of different manners based on, for example, firmware or software being executed by the processor 102. By way of example, the processor 102 can determine to power on the memory cells 106 at times when a firmware or software program running on the processor 102 has data to write to or read from the storage component 104, can determine to power off the memory cells 106 at times when no firmware or software program running on the processor 102 has data to write to or read from the storage component 104, can determine to power off the memory cells 106 at times when the system 100 is going into a sleep or low power mode, and so forth.

The storage controller 108 also makes a determination as to when the memory cells 106 are to be powered on and when the memory cells 106 are to be powered off. The storage controller 108 includes a core module 112, optionally a mapping table 114, and optionally a cache 116. The core module 112 implements at least part of the logic and functionality of the storage controller 108, including determining when the memory cells 106 are to be powered on and when the memory cells 106 are to be powered off. The core module 112 can be implemented in, for example, a combination of hardware and firmware.

The mapping table 114 maintains a mapping of logical addresses to memory cells 106. When data is read from the storage component 104 (e.g. by the processor 102), a logical address that is to be read from is provided to the storage component 104 and the storage controller 108 receives this logical address. In the case of a read request, the core module 112 uses the mapping table 114 to determine which memory cells 106 store the data identified by the received logical address. The storage controller 108 reads the data from the determined memory cells 106 and returns the read data to the component or program from which the read request was received. In the case of a write request, the core module 112 determines which memory cells 106 are to store the received data. The mapping table 114 is updated with a mapping of a logical address to the memory cells 106 in which the received data is stored, and the logical address is returned to the component or program from which the write request was received.

The cache 116 is a cache storing data to be written to and/or that has been read from the memory cells 106. The cache 116 can be implemented using various different types of technology, such as NAND gates or cells, NOR gates or cells, SCM gates or cells, DRAM gates or cells, combinations thereof, and so forth.

The storage controller 108 can make the determination as to when the memory cells 106 are to be powered on and when the memory cells 106 are to be powered off in a variety of different manners. By way of example, the storage controller 108 can determine to power off the memory cells 106 when responding to a read request for data that is stored in the cache 116, and determine to power on the memory cells 106 when responding to a read request for data that is stored in the memory cells 106 but not in the cache 116. By way of another example, the storage controller 108 can determine to power off the memory cells 106 when updating or performing maintenance on the mapping table 114 (e.g., because storage controller 108 will not read from or write to the memory cells 106 while such updating or maintenance is being performed on the mapping table 114).

The processor 102 and the storage controller 108 can each individually determine when the memory cells 106 are to be powered on and when the memory cells 106 are to be powered off. A processor power enable line 120 is provided from the processor 102 to the combinatorial logic component 124. The processor 102 asserts (makes active) a processor power enable signal on the processor power enable line 120 while the processor 102 determines that the memory cells are to be powered on, and does not assert (makes inactive) the processor power enable signal on the processor power enable line 120 while the processor 102 determines that the memory cells 106 are to be powered off. Similarly, a storage controller power enable line 122 is provided from the storage controller 108 to the combinatorial logic component 124. The storage controller 108 asserts (makes active) a storage controller power enable signal on the storage controller power enable line 122 while the storage controller 108 determines that the memory cells 106 are to be powered on, and does not assert (makes inactive) the storage controller power enable signal on the storage controller power enable line 122 while the storage controller 108 determines that the memory cells 106 are to be powered off.

The processor power enable signal line 120 and the storage controller power enable signal line 122 are both inputs to the combinatorial logic component 124, and a switch control line 126 is output from the combinatorial logic component 124 to a power switch 128. The combinatorial logic component 124 generates an output signal on the switch control line 126 by performing, for example, a logical OR operation on the storage controller power enable signal on line 122 and the processor power enable signal on line 120.

The power switch 128 is turned on and off by the signal on the switch control line 126. When the switch control line 126 has a first state (e.g., a "low" value, which is an electrical low voltage or ground voltage, such as 0 volts), the power switch 128 is turned on. When the switch control line 126 has a second state (e.g., a "high" value, which is an electrical high voltage such as at least 1.1 volts), the power switch 128 is turned off. The power switch 128 can be implemented using any of a variety of different technologies. For example, the power switch 128 can be a Metal Oxide Semiconductor Field Effect Transistor (MOSFET), other types of Field Effect Transistors (FETs), or other types of switches.

The power switch 128 controls providing an input power to the memory cells 106 using an input power line 130. The input power is power provided to the storage component 104 via the input power line 130 from a power source in the system 100 or otherwise coupled to the system 100. The input power 130 is a DC (direct current) power input that is sufficient to power the memory cells 106. The input power can be, for example, an input power of at least 2.7 volts. When the power switch 128 is turned on, the input power on the input power line 130 is provided to the memory cells 106 as memory cell power in 132 (e.g., the memory cell power in 132 is at least 2.7 volts). When the power switch 128 is turned off, the input power on the input power line 130 is not provided to the memory cells 106 (e.g., the memory cell power in 132 is 0 volts). In one or more embodiments, the memory cells 106 are powered only by the memory cell power in 132. Accordingly, if the power switch 128 is turned off, the memory cells 106 are powered off.

The storage controller 108 oftentimes has better or more knowledge of the memory cells 106 and whether the memory cells 106 are to be powered on or powered off than the processor 102 has. For example, the processor 102 may determine that the memory cells 106 are to be powered on to respond to a read request, but the storage controller 108 knows that the data that is to be returned for the read request is available in the cache 116 and thus the memory cells 106 need not be powered on. By way of another example, the processor 102 may determine that the memory cells 106 are to be powered on to respond to a read request or a write request, but the storage controller 108 knows that the mapping table 114 is being updated and that the memory cells 106 cannot be accessed to respond to the read request or write request while the mapping table 114 is being updated. Accordingly, the storage controller 108 knows that the memory cells 106 need not be powered on until the updating of the mapping table 114 is completed.

The combinatorial logic component 124 and power switch 128 operate in accordance with the rules in Table I below. Each row in Table I is a rule indicating whether the memory cells are to be powered on based on whether the processor determines the memory cells are to be powered on and based on whether the storage component determines the memory cells are to be powered on.

TABLE I

| Processor determines memory cells are to be powered on? | Storage controller determines memory cells are to be powered on? | Memory cells powered on? |
| --- | --- | --- |
| No | No | No |
| No | Yes | No |
| Yes | No | No |
| Yes | Yes | Yes |

As shown in Table I, even if the processor 102 determines that the memory cells 106 are to be powered on, the memory cells 106 are powered off if the storage controller 108 determines that the memory cells 106 are to be powered off. This allows the storage controller 108 to override a determination by the processor 102 to power on the memory cells

106. Essentially, this makes the memory cells 106 slaves to the storage controller 108 rather than the processor 102.

It should be noted, however, that the processor 102 can still determine to power off the memory cells 106 and that this determination is not overridden by the storage controller 108. Thus, for example, if the processor 102 determines that the system 100 is to enter a low power or sleep mode, and thus that the memory cells 106 are to be powered off, that determination to power off the memory cells 106 is not overridden by the storage controller 108.

It should also be noted that additional power lines are included in the system 100, although these additional power lines are not shown in FIG. 1 to avoid cluttering the drawings. For example, power is provided to the storage controller 108 and the combinatorial logic component 124. The power provided to the storage controller 108 and the combinatorial logic component 124 can be the input power (e.g., from the input power line 130) or alternatively a different power line (e.g., power at 1.1 volts or 1.8 volts rather than the 2.7 volts of the input power on the input power line 130). However, even though other components such as the storage controller 108 may be powered on, power usage by the storage component 104 is still reduced by powering off the memory cells 106 using the techniques discussed herein.

Figure 2:
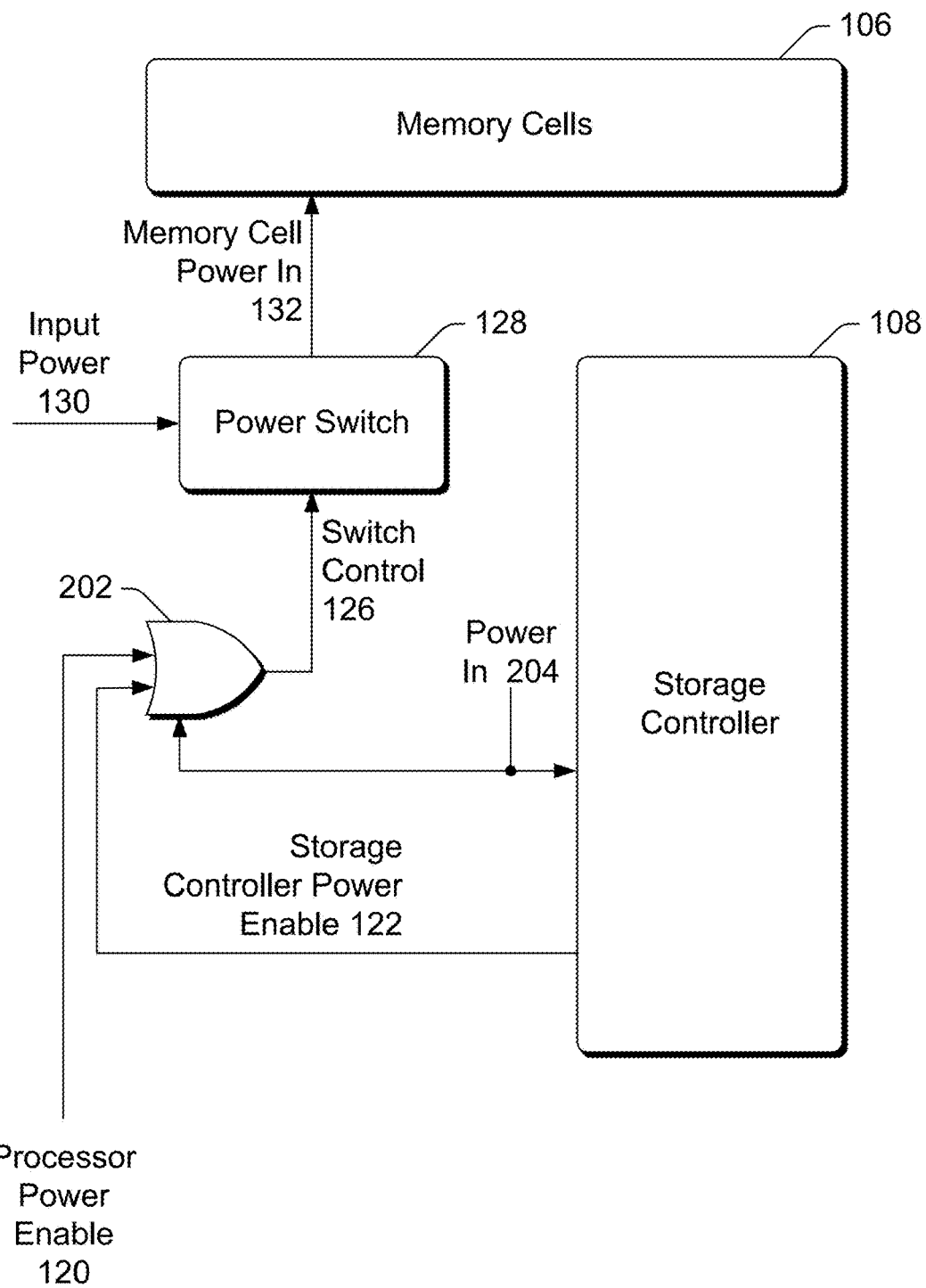
FIG. 2 illustrates an example implementation of a storage component.

FIG. 2 illustrates an example implementation of the storage component 104. The storage component 104 includes memory cells 106, a storage controller 108, and a power switch 128 as discussed above with respect to FIG. 1. Although not shown in FIG. 2, the storage controller 108 can include a core module 112, optionally a mapping table 114, and optionally a cache 116 as discussed above with respect to FIG. 1. The combinatorial logic component 124 is implemented as a logical OR gate 202. The logical OR gate and the storage controller 108 are powered by a power in line 204. The power in line 204 can be coupled to the input power line 130, or alternatively can be a different power line (e.g., providing power at 1.1 volts or 1.8 volts rather than the 2.7 volts of the input power on the input power line 130).

In the example implementation of FIG. 2, when the switch control line 126 input to the power switch 128 is in a first state (e.g., "low" or 0 volts), the power switch 128 is turned on. And, when the switch control line 126 input to the power switch 128 is in a second state (e.g., "high" or at least 1.1 volts), the power switch 128 is turned off.

The processor power enable line 120 is driven low (e.g., 0 volts) by the processor 102 of FIG. 1 to assert the processor power enable signal on the processor power enable line 120, indicating that the processor 102 has determined that the memory cells 106 are to be powered on. The processor power enable line 120 is driven high (e.g., at least 1.1 volts) by the processor 102 to not assert (or de-assert) the processor power enable signal on the processor power enable line 120, indicating that the processor has determined that the memory cells are to be powered off.

Similarly, the storage controller power enable line 122 is driven low (e.g., 0 volts) by the storage controller 108 to assert the storage controller power enable signal on the storage controller power enable line 122, indicating that the storage controller 108 has determined that the memory cells 106 are to be powered on. The storage controller power enable line 122 is driven high (e.g., at least 1.1 volts) by the storage controller 108 to not assert (or de-assert) the storage controller power enable signal on the storage controller power enable line 122, indicating that the storage controller 108 has determined that the memory cells are to be powered off.

If both the processor power enable signal on the processor power enable line 120 and the storage controller power enable signal on the storage controller power enable line 122 are asserted, both signals are low and the output of the logical OR gate 202 (the switch control line 126) is low. The switch control line 126 being low turns on the power switch 128, resulting in the input power on the input power line 130 being provided to the memory cells 106 as memory cell power in 132. Thus, power is provided to the memory cells 106 if both the processor 102 and the storage controller 108 determine that the memory cells are to be powered on.

If the processor power enable signal on the processor power enable line 120 is asserted (is low) but the storage controller power enable signal on the storage controller power enable line 122 is not asserted (is high), then the output of the logical OR gate 202 (the switch control line 126) is high. The switch control line 126 being high turns off the power switch 128, and no power is provided to the memory cells 106. Thus, the storage controller 108 can effectively override the processor 102's determination to power on the memory cells 106, and keep the memory cells 106 powered off if the storage controller 108 determines that the memory cells 106 need not be powered on.

If the processor power enable signal on the processor power enable line 120 is not asserted (is high) but the storage controller power enable signal on the storage controller power enable line 122 is asserted (is low), then the output of the logical OR gate 202 (the switch control line 126) is high. The switch control line 126 being high turns off the power switch 128, and no power is provided to the memory cells 106. Thus, the processor 102 can force the memory cells 106 into being powered off (e.g., if the device that includes the storage component 104 is to be in a sleep or a low power mode).

If both the processor power enable signal on the processor power enable line 120 and the storage controller power enable signal on the storage controller power enable line 122 are not asserted (both are high), then the output of the logical OR gate 202 (the switch control line 126) is high. The switch control line 126 being high turns off the power switch 128, and no power is provided to the memory cells 106. Thus, the memory cells are powered off if both the processor 102 and the storage controller 108 determine that the memory cells are to be powered off.

Figure 3:
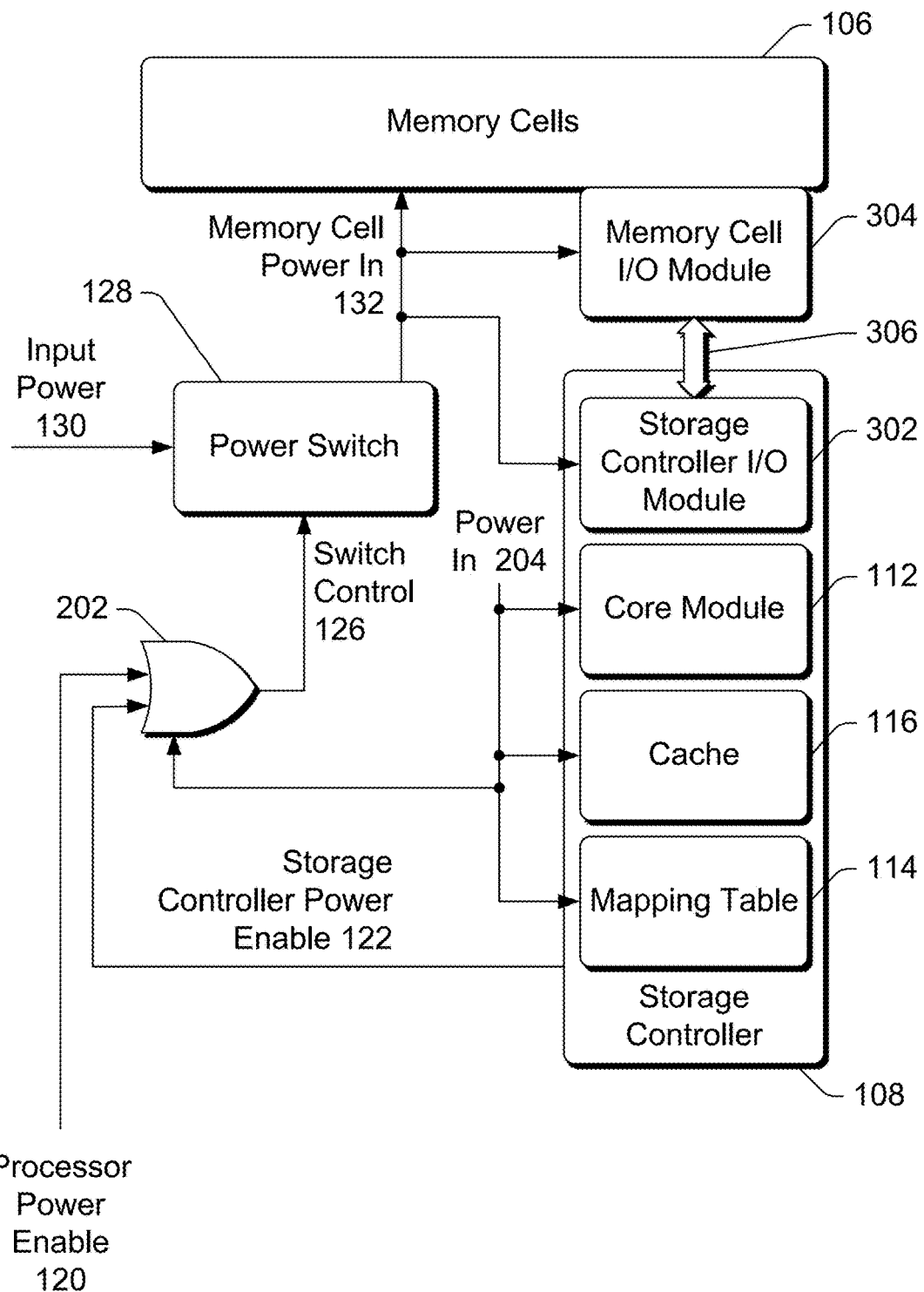
FIG. 3 illustrates another example implementation of a storage component.

FIG. 3 illustrates another example implementation of the storage component 104. The storage component 104 includes memory cells 106, a storage controller 108, and a power switch 128 as discussed above with respect to FIGS. 1 and 2. The combinatorial logic component 124 is implemented as a logical OR gate 202 that is powered by a power in line 204 as discussed above with respect to FIG. 2.

In the example implementation of FIG. 3, the storage controller 108 includes a storage controller I/O module 302, and a memory cell I/O module 304 is coupled to the memory cells 106. The storage controller I/O module 302 includes hardware (and optionally firmware) to communicate with the memory cell I/O module 304, transferring commands and data both to and from the memory cell I/O module 304 via data and control lines 306. Similarly, the memory cell I/O module 304 includes hardware (and optionally firmware) to communicate with the storage controller I/O module 302, transferring commands and data both to and from the storage controller I/O module 304 via the data and control lines 306. The memory cell I/O module 304 and the storage controller I/O module 302 thus provide the interface to communicate data and commands between the memory cells 106 and the storage controller 108.

Writing data to the memory cells 106 and reading data from the memory cells 106 is thus performed via the memory cell I/O module 304 and the storage controller I/O module 302. For example, if a read request is received by the storage controller 108 (e.g., from a processor 102 of FIG. 1), the core module 112 accesses the mapping table 114 to determine the physical memory cells 106 in which the requested data is stored, and then sends a request for the data stored in those physical memory cells to the storage controller I/O module 302. The storage controller I/O module 302 communicates with the memory cell I/O module 304, which in turn reads the data from the memory cells 106, and returns the read data to the storage controller I/O module 302. The storage controller I/O module 302 then returns to the read data to the core module 112, which returns the read data to the processor from which the read request was received.

The power in line 204 provides power to components of the storage controller 108 other than the storage controller I/O module 302, including the core module 112, the cache 116, and the mapping table 114. However, the memory cell power in line 132 provides power to the memory cell I/O module 304 and the storage controller I/O module 302, as well as to the memory cells 106. If the memory cells 106 are powered off, then there is no need to power the I/O modules 302 and 304 that provide the interface to communicate data and commands between the memory cells 106 and the storage controller 108. Accordingly, if the memory cells 106 are powered off, then the hardware that makes up the I/O modules 302 and 304 is also powered off. Other components of the storage controller 108, however, are not powered off as they receive power via power in line 204.

Figure 4:
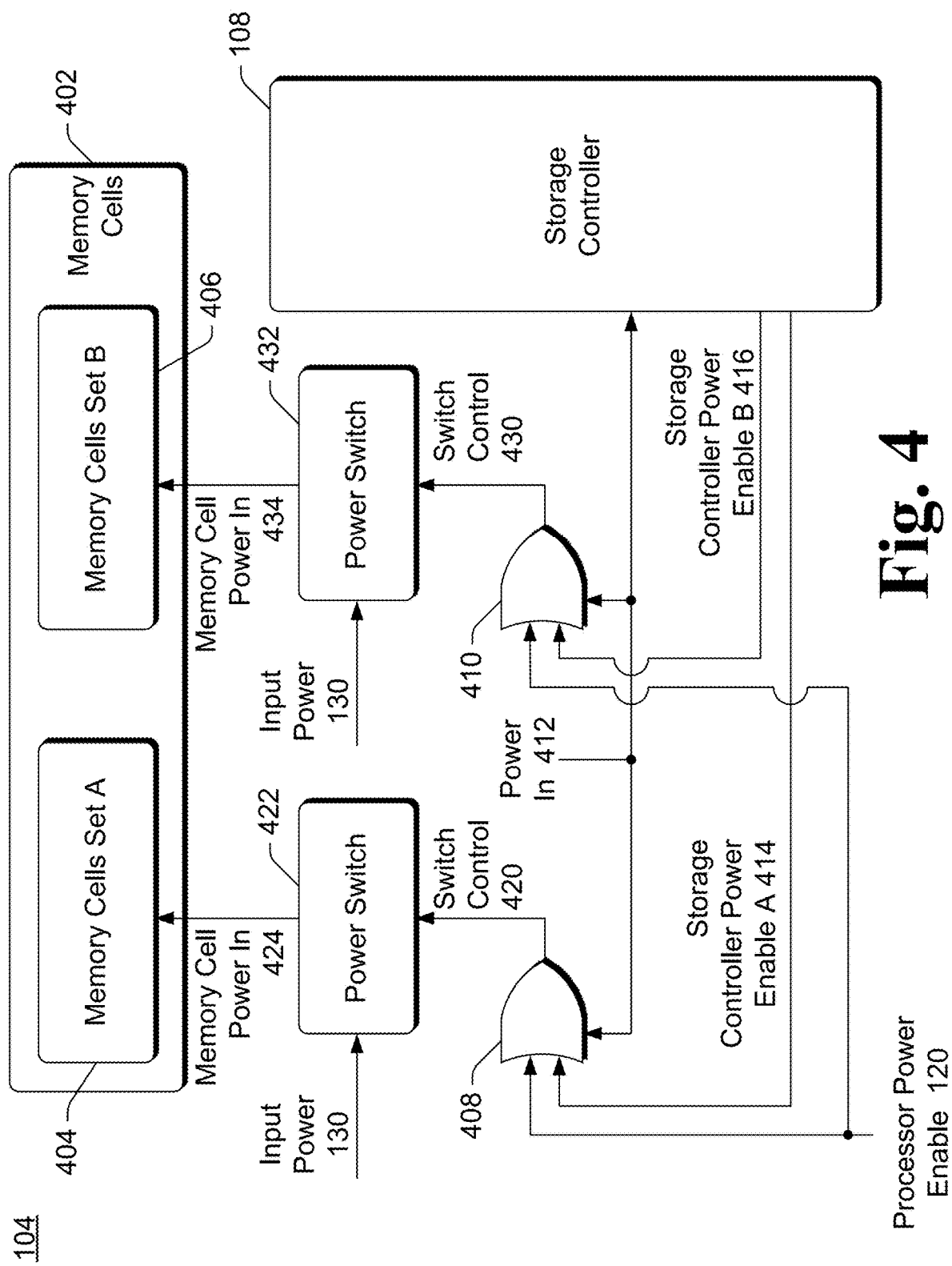
FIG. 4 illustrates another example implementation of a storage component.

FIG. 4 illustrates another example implementation of the storage component 104. In the example of FIG. 4, the storage component 104 operates similarly to the storage component 104 in the example of FIG. 2, except that there are two logical OR gate and power switch pairs, each pair providing power to a different set of memory cells. Otherwise, each logical OR gate and power switch pair operates analogously to the logical OR gate 202 and power switch 128 of FIG. 2.

The storage component 104 includes a storage controller 108 as discussed above with respect to FIGS. 1 and 2. Although not shown in FIG. 4, the storage controller 108 can include a core module 112, optionally a mapping table 114, and optionally a cache 116 as discussed above with respect to FIG. 1. The storage component 104 also includes memory cells 402 that are made up of two sets of memory cells, referred to as memory cells set A 404 and memory cells set B 406. The memory cells sets 404 and 406 can be implemented using any of a variety of technologies, analogous to memory cells 106 discussed above. The memory cells sets 404 and 406 can be the same types of cells (e.g., implemented using the same technology), different types of cells (e.g., implemented using different technologies), or combinations thereof. At least one of the memory cells sets 404 and 406 can also optionally include volatile memory (e.g., DRAM). By way of example, in one or more embodiments the memory cells set A 404 is implemented using NAND cells and the memory cells set B 406 is implemented using DRAM cells. By way of another example, in one or more embodiments the memory cells set A 404 is implemented using NAND cells and the memory cells set B 406 is implemented using SCM cells.

Two combinatorial logic components are included in the example of FIG. 4, each being implemented as a logical OR gate. The logical OR gates 408 and 410 and the storage controller 108 are powered by a power in line 412. The power in line 412 can be coupled to the input power line 130, or alternatively can be a different power line (e.g., providing power at 1.1 volts or 1.8 volts rather than the 2.7 volts of the input power on the input power line 130).

A processor power enable line 120 is provided from the processor 102 to the logical OR gate 408 and to the logical OR gate 410. The processor 102 asserts a processor power enable signal on the processor power enable line 120 while the processor 102 determines that the memory cells are to be powered on, and does not assert the processor power enable signal on the processor power enable line 120 while the processor 102 determines that the memory cells 106 are to be powered off as discussed above.

A storage controller power enable line A 414 is provided from the storage controller 108 to the logical OR gate 408. The storage controller 108 asserts a storage controller power enable A signal on the storage controller power enable A line 414 while the storage controller 108 determines that the memory cells set A 404 are to be powered on, and does not assert the storage controller power enable A signal on the storage controller power enable A line 414 while the storage controller 108 determines that the memory cells set A 404 are to be powered off.

Similarly, a storage controller power enable line B 416 is provided from the storage controller 108 to the logical OR gate 410. The storage controller 108 asserts a storage controller power enable B signal on the storage controller power enable B line 416 while the storage controller 108 determines that the memory cells set B 406 are to be powered on, and does not assert the storage controller power enable B signal on the storage controller power enable B line 416 while the storage controller 108 determines that the memory cells set B 406 are to be powered off.

The processor power enable signal line 120 and the storage controller power enable signal line A 414 are both inputs to the logical OR gate 408, and a switch control line 420 is output from the logical OR gate 408 to a power switch 422. The logical OR gate 408 generates an output signal on the switch control line 420 by performing a logical OR operation on the storage controller power enable A signal on line 414 and the processor power enable signal on line 120.

The power switch 422 controls providing an input power to the memory cells set A 404 using the input power line 130. The input power 130 is a DC power input that is sufficient to power the memory cells set A 404. When the power switch 422 is turned on, the input power on the input power line 130 is provided to the memory cells set A 404 as memory cell power in 424 (e.g., the memory cell power in 424 is at least 2.7 volts). When the power switch 422 is turned off, the input power on the input power line 130 is not provided to the memory cells set A 404 (e.g., the memory cell power in 424 is 0 volts). In one or more embodiments, the memory cells set A 404 are powered only by the memory cell power in 424. Accordingly, if the power switch 422 is turned off, the memory cells set A 404 are powered off.

The processor power enable signal line 120 and the storage controller power enable signal line B 416 are both inputs to the logical OR gate 410, and a switch control line 430 is output from the logical OR gate 410 to a power switch 432. The logical OR gate 410 generates an output signal on the switch control line 430 by performing a logical OR operation on the storage controller power enable B signal on line 416 and the processor power enable signal on line 120.

The power switch 430 controls providing an input power to the memory cells set B 406 using the input power line 130. Although illustrated as using the same input power line 130 as is input to the power switch 422, additionally or alternatively two different input power lines (e.g., having different voltages) can be input to the power switches 422 and 432. For example, the input power to the power switch 422 may be 2.7 volts and the input power to the power switch 432 may be 1.8 volts. The voltage input to the power switch 422 is based on the voltage input used by the memory cells set A 404 (e.g., the voltage input to the power switch 422 is at least the voltage input needed by the memory cells set A 404 to operate). Similarly, the voltage input to the power switch 432 is based on the voltage input used by the memory cells set B 406 (e.g., the voltage input to the power switch 432 is at least the voltage input needed by the memory cells set B 406 to operate).

When the power switch 432 is turned on, the input power (e.g., on the input power line 130) is provided to the memory cells set B 406 as memory cell power in 434 (e.g., the memory cell power in 424 is at least 2.7 volts). When the power switch 432 is turned off, the input power (e.g., on the input power line 130) is not provided to the memory cells set B 406 (e.g., the memory cell power in 434 is 0 volts). In one or more embodiments, the memory cells set B 406 are powered only by the memory cell power in 434. Accordingly, if the power switch 432 is turned off, the memory cells set B 406 are powered off.

The storage controller 108 oftentimes has better or more knowledge of the memory cells 402 and whether one or both of the memory cells set A 404 and the memory cells set B 406 are to be powered on or powered off than the processor 102 has. For example, the processor 102 may determine that the memory cells 402 are to be powered on to respond to a read request, but the storage controller 108 knows that the data that is to be returned for the read request is available from memory cells set A 404 and thus the memory cells set B 406 need not be powered on.

It should be noted that in the illustrated example of FIG. 4, two memory cell power in lines 424 and 434 are illustrated. Since the DRAM needs to be powered on to keep the memory contents, the two memory cell power in lines 424 and 434 allow the DRAM to have a separate memory cell power in line than the nonvolatile memory cells, allowing the nonvolatile memory cells to be powered off while the DRAM cells are powered on. Additionally or alternatively, a design decision can be made to let the DRAM contents be erased whenever the nonvolatile memory cells are powered down, in which case no separate memory cell power in line need be used for the DRAM cells. For example, rather than multiple power in lines 424 and 434 as illustrated in FIG. 4, the memory cells 106 of FIG. 2 can include both DRAM cells and nonvolatile memory cells that are powered on or powered off by a single memory cell power in line 132.

It should further be noted that although two sets of memory cells are illustrated as part of the memory cells 402 in FIG. 4, the memory cells 402 can include any number of different sets of memory cells. These different sets can be implemented using the same and/or different types of memory cells (e.g., the same and/or different technologies). For each different set of memory cells, a logical OR gate and power switch is used to determine whether to provide power in to the set of memory cells analogous to the discussion above. Additionally, for each different set of memory cells, the storage controller 108 has a storage controller power enable line that provides a storage controller power enable signal to the logical OR gate indicating whether the storage controller 108 determines that the set of memory cells are to be powered off.

It should also be noted that different implementations of the storage component 104 are illustrated in FIGS. 2, 3, and 4, and that these implementations can be combined. For example, the implementations in FIGS. 3 and 4 can be combined so that the storage controller 108 and memory cells 402 include one pair of I/O modules analogous to I/O modules 302 and 304 of FIG. 3 that are powered by the memory cell power in line 424. Furthermore, the storage controller 108 and memory cells 402 can also include an additional pair of I/O modules analogous to I/O modules 302 and 304 of FIG. 3 that are powered by the memory cell power in line 434.

Returning to FIG. 1, the combinatorial logic component 124 and the power switch 128 operate together to implement the rules shown in Table I. A variety of different combinatorial logic can be used to implement the combinatorial logic component 124. For example, the combinatorial logic component 124 can be implemented using a logical OR gate as discussed above with reference to FIGS. 2, 3, and 4. By way of another example, the combinatorial logic component 124 can be implemented to generate an output analogous to that discussed with reference to the logical OR gates in FIGS. 2, 3, and 4, but using logical NOR (negative-OR) gates and/or using logical NAND gates.

Figure 5:
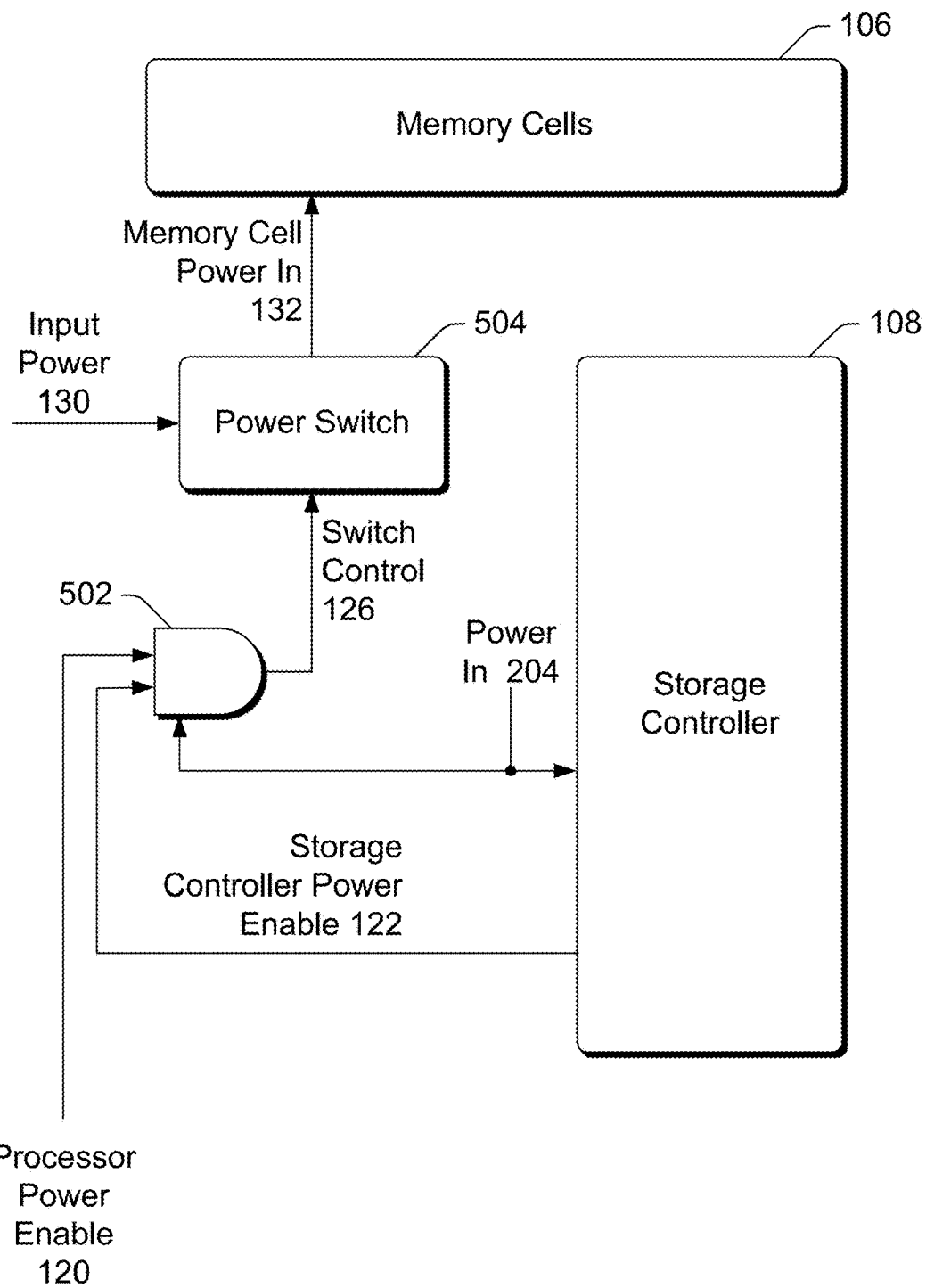
FIG. 5 illustrates another example implementation of a storage component.

By way of another example, the combinatorial logic component 124 can be implemented using a logical AND gate rather than a logical OR gate. FIG. 5 illustrates another example implementation of the storage component 104 in which the combinatorial logic component 124 is implemented using a logical AND gate. The storage component 104 includes memory cells 106 and a storage controller 108 as discussed above with respect to FIGS. 1 and 2. The combinatorial logic component 124 is implemented as a logical AND gate 502 that is powered by a power in line 204.

The example implementation of FIG. 5 includes a power switch 504. The power switch 504 is similar to the power switch 128 of FIGS. 2, 3, and 4, but is turned on (and off) using a different state than the power switch 128. When the switch control line input to the power switch 504 is in one state (e.g., high or at least 1.1 volts), the power switch 504 is turned on. And, when the switch control line 126 input to the power switch 504 is in another state (e.g., low or 0 volts), the power switch 504 is turned off.

The processor power enable line 120 is driven high (e.g., at least 1.1 volts) by the processor 102 to assert the processor power enable signal on the processor power enable line 120, indicating that the processor 102 has determined that the memory cells 106 are to be powered on. The processor power enable line 120 is driven low (e.g., 0 volts) by the processor 102 to not assert (or de-assert) the processor power enable signal on the processor power enable line 120, indicating that the processor has determined that the memory cells are to be powered off.

Similarly, the storage controller power enable line 122 is driven high (e.g., at least 1.1 volts) by the storage controller 108 to assert the storage controller power enable signal on the storage controller power enable line 122, indicating that the storage controller 108 has determined that the memory cells 106 are to be powered on. The storage controller power enable line 122 is driven low (e.g., 0 volts) by the storage controller 108 to not assert (or de-assert) the storage controller power enable signal on the storage controller power enable line 122, indicating that the storage controller 108 has determined that the memory cells are to be powered off.

If both the processor power enable signal on the processor power enable line 120 and the storage controller power enable signal on the storage controller power enable line 122 are asserted, both signals are high and the output of the logical AND gate 502 (the switch control line 126) is high. The switch control line 126 being high turns on the power switch 504, resulting in the input power on the input power line 130 being provided to the memory cells 106 as memory cell power in 132. Thus, power is provided to the memory cells 106 if both the processor 102 and the storage controller 108 determine that the memory cells are to be powered on.

If either one or both of the processor power enable signal on the processor power enable line 120 and the storage controller power enable signal on the storage controller power enable line 122 is not asserted (is low), then the output of the logical AND gate 502 (the switch control line 126) is low. The switch control line 126 being low turns off the power switch 504, and no power is provided to the memory cells 106.

Figure 6:
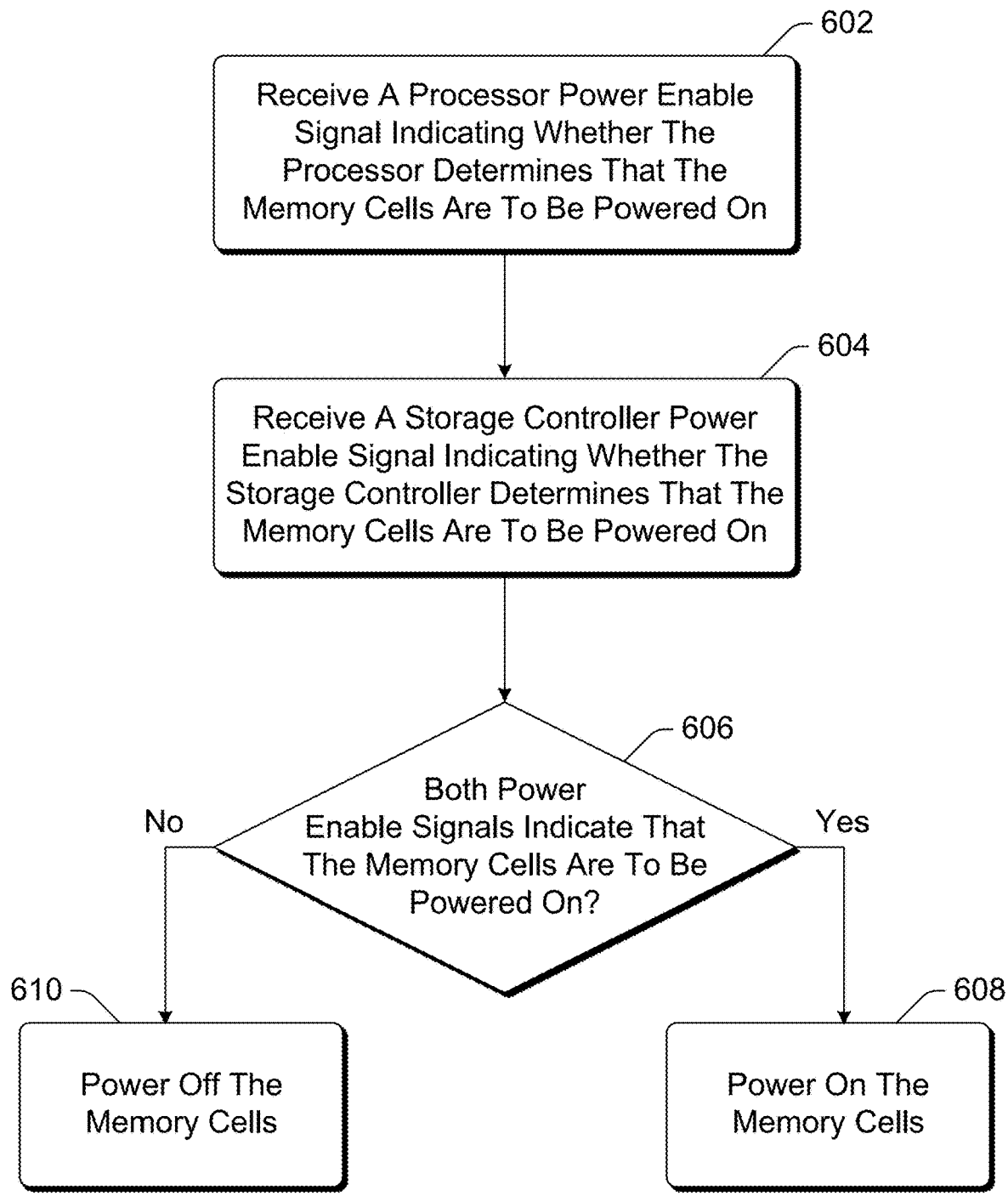
FIG. 6 is a flowchart illustrating an example process for implementing the hybrid powering off of storage component memory cells.

FIG. 6 is a flowchart illustrating an example process 600 for implementing the hybrid powering off of storage component memory cells. Process 600 is carried out by a component or device, such as a storage component 104 of FIGS. 1-5, or a device implementing the system 100 of FIG. 1. Process 600 is implemented at least in part in hardware, although additionally or alternatively process 600 can be implemented in part in software or firmware, or any combination of software, firmware, and hardware. Process 600 is shown as a set of acts and is not limited to the order shown for performing the operations of the various acts. Process 600 is an example process for implementing the hybrid powering off of storage component memory cells; additional discussions of implementing the hybrid powering off of storage component memory cells are included herein with reference to different figures.

In process 600, a processor power enable signal indicating whether a processor desires that the memory cells of a storage component are to be powered on (act 602). The processor is a processor included in a device that also includes or is coupled to the storage component.

A storage controller power enable signal indicating whether a storage controller of the storage component desires that the memory cells of a storage component are to be powered on (act 604). The storage controller typically has more knowledge regarding the memory cells and data stored in the memory cells than the processor has, and thus may determine that the memory cells need not be powered on in situations that the processor determines that the memory cells are to be powered on, as discussed above.

Process 600 proceeds based on whether both of the power enable signals received in acts 602 and 604 indicate that the memory cells are to be powered on (act 606). If both of the power enable signals received in acts 602 and 604 indicate that the memory cells are to be powered on, then the memory cells are powered on (act 608). The memory cells are powered on by, for example, a power switch being turned on to allow an input power to be provided to the memory cells. However, if both of the power enable signals received in acts 602 and 604 do not indicate that the memory cells are to be powered on, then the memory cells are powered off (act 610). The memory cells are powered off by, for example, a power switch being turned off to prevent an input power from being provided to the memory cells.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 7:
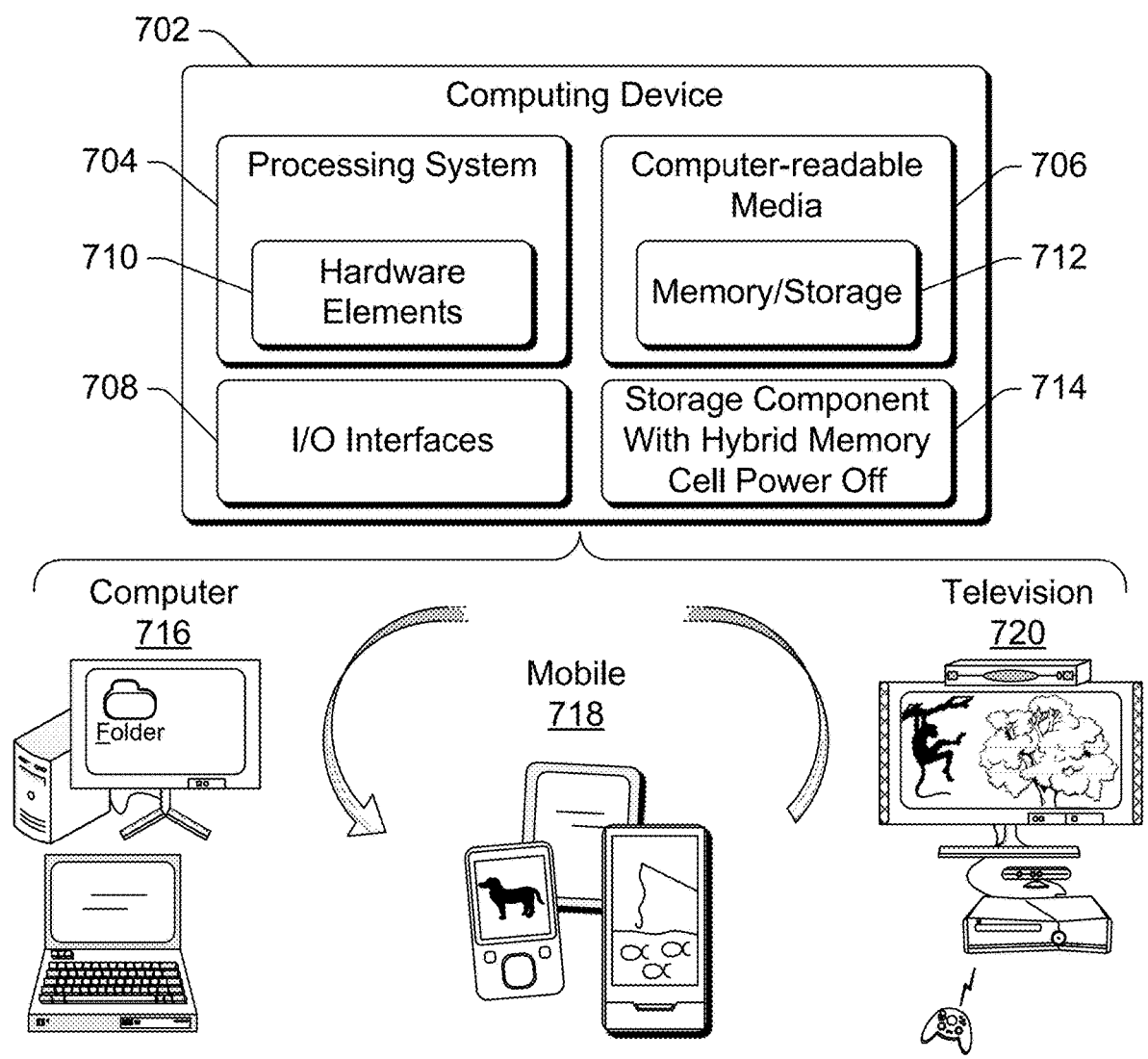
FIG. 7 illustrates an example computing device that is representative of one or more systems and/or devices that may implement the various techniques described herein.

FIG. 7 illustrates an example computing device 702 that is representative of one or more systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Resistive RAM (ReRAM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The memory/storage 712 may include SCM such as 3D Xpoint memory. The computer-readable media 706 may be configured in a variety of other ways as further described below.

The one or more input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

The computing device 702 also includes a storage component with hybrid memory cell power off 714. The storage component with hybrid memory cell power off 714 is a storage component with memory cells and a storage controller, and supports hybrid powering off of the memory cells as discussed above. The storage component with hybrid memory cell power off 714 can implement, for example, the storage component 104 of FIGS. 1, 2, 3, 4, and/or 5.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information. Computer-readable storage media is media and/or storage that is tangible, in contrast to mere signal transmission, carrier waves, or signals per se. Thus, computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on. The computing device 702 may also be implemented as the television 720 class of device that includes devices having or connected to generally larger screens in casual viewing environments. These devices include televisions, set-top boxes, gaming consoles, and so on.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A storage component comprising: a plurality of memory cells; a storage controller having as an output a first power enable line; a combinatorial logic component, coupled to the storage controller and a processor, having as inputs the first power enable line and a second power enable line from the processor, the combinatorial logic component having as an output a switch control line having a first state or a second state that is based on whether the first power enable line is asserted and whether the second power enable line is asserted; and a power switch, coupled to the combinatorial logic component, having as an input an input power line and the switch control line, the power switch having an output to provide power from the input power line to the plurality of memory cells in response to the switch control line having the first state, and to provide no power from the input power line to the plurality of memory cells in response to the switch control line having the second state.

Alternatively or in addition to any of the methods, devices, systems, or storage components, described herein, any one or combination of: the plurality of memory cells comprising NAND cells; the combinatorial logic component comprising a logical OR gate; the storage component further comprising a memory cell I/O module and a storage controller I/O module providing an interface to communicate data between the plurality of memory cells and the storage controller, the output of the power switch being further coupled to hardware of the memory cell I/O module and hardware of the storage controller I/O module, the hardware of the memory cell I/O module and the hardware of the storage controller I/O module receiving power from the input power line in response to the switch control line having the first state, and the hardware of the memory cell I/O module and the hardware of the storage controller I/O module receiving no power from the input power line in response to the switch control line having the second state; the storage controller including multiple additional components coupled to an additional power line, the multiple additional components receiving power regardless of whether the switch control line has the first state or the second state; the plurality of memory cells including a first set of memory cells of a first type and a second set of memory cells of a second type, the power switch having an output to provide power from the input power line to the first set of memory cells in response to the switch control line having the first state, and to provide no power from the input power line to the first set of memory cells in response to the switch control line having the second state, the storage component further comprising an additional combinatorial logic component, coupled to the storage controller and the processor, having as inputs the second power enable line from the processor and a third power enable line coupled to the storage controller, the additional combinatorial logic component having as an output an additional switch control line having the first state or the second state that is based on whether the second power enable line is asserted and whether the third power enable line is asserted, and an additional power switch, coupled to the additional combinatorial logic component, having as an input an additional input power line and the additional switch control line, the additional power switch having an output to provide power from the additional input power line to the second set of memory cells in response to the additional switch control line having the first state, and to provide no power from the additional input power line to the second set of memory cells in response to the additional switch control line having the second state; the first type of memory cells and the second type of memory cells being implemented using different technologies; the first type of memory cells comprising NAND cells and the second type of memory cells comprising DRAM cells.

A method comprising: receiving, from a processor, a processor power enable signal indicating whether the processor determines that memory cells of a storage component are to be powered on; receiving, from a storage controller of the storage component, a storage controller power enable signal indicating whether the storage controller determines that the memory cells of the storage component are to be powered on; powering on the memory cells in response to both the processor power enable signal and the storage controller power enable signal indicating that the memory cells are to be powered on; and powering off the memory cells in response to at least one of the processor power enable signal and the storage controller power enable signal indicating that the memory cells are to be powered off.

Alternatively or in addition to any of the methods, devices, systems, or storage components, described herein, any one or combination of: the method being implemented by a combinatorial logic component of the storage component; the powering on the memory cells comprising providing a switch control signal to a power switch to turn on the power switch to cause an input power to be provided to the memory cells; the powering off the memory cells comprising providing a switch control signal to a power switch to turn off the power switch to prevent an input power from being provided to the memory cells; the memory cells comprising NAND cells; the method further comprising providing, in response to both the processor power enable signal and the storage controller power enable signal indicating that the memory cells are to be powered on, the input power to a memory cell I/O module and a storage controller I/O module providing an interface to communicate data between the memory cells and the storage controller; the powering on the memory cells comprising powering on a first set of the memory cells but leaving a second set of the memory cells powered off.

A system comprising: a plurality of memory cells; a processor having as an output a processor power enable line; a storage controller having as an output a first storage controller power enable line; a first combinatorial logic component, coupled to the storage controller and the processor, having as inputs the first storage controller power enable line and the processor power enable line, the first combinatorial logic component having as an output a first switch control line having a first state or a second state that is based on whether the processor power enable line is asserted and whether the first storage controller power enable line is asserted; and a first power switch, coupled to the first combinatorial logic component, having as inputs a first input power line and the first switch control line, the first power switch having an output to provide power from the first input power line to the plurality of memory cells in response to the first switch control line having the first state, and to provide no power from the input power line to the plurality of memory cells in response to the first switch control line having the second state.

Alternatively or in addition to any of the methods, devices, systems, or storage components, described herein, any one or combination of: the storage controller having as an additional output a second storage controller power enable line, the plurality of memory cells including a first set of memory cells of a first type and a second set of memory cells of a second type, the first power switch having an output to provide power from the first input power line to the first set of memory cells in response to the first switch control line having the first state, and to provide no power from the first input power line to the first set of memory cells in response to the first switch control line having the second state, the system further comprising a second combinatorial logic component, coupled to the storage controller and the processor, having as inputs the processor power enable line and the second storage controller power enable line, the second combinatorial logic component having as an output a second switch control line having the first state or the second state that is based on whether the processor power enable line is asserted and whether the second storage controller power enable line is asserted, and a second power switch, coupled to the second combinatorial logic component, having as inputs a second input power line and the second switch control line, the second power switch having an output to provide power from the second input power line to the second set of memory cells in response to the second switch control line having the first state, and to provide no power from the second input power line to the second set of memory cells in response to the second switch control line having the second state; the first type of memory cells and the second type of memory cells being implemented using different technologies; the first input power line providing a different voltage than the second input power line; the plurality of memory cells comprising NAND cells.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A storage component comprising:
   a plurality of memory cells;
   a storage controller configured to manage storage of data in the plurality of memory cells and retrieval of data from the plurality of memory cells, the storage controller having as an output a storage controller power enable line;
   a combinatorial logic component having as inputs the storage controller power enable line and a processor power enable line from a processor, the combinatorial logic component having as an output a switch control line having a first state or a second state that is based on whether the storage controller power enable line is asserted and whether the processor power enable line is asserted; and
   a power switch, coupled to the combinatorial logic component, having as an input an input power line and the switch control line, the power switch having an output to provide power from the input power line to the plurality of memory cells in response to the switch control line having the first state, and to provide no power from the input power line to the plurality of memory cells in response to the switch control line having the second state,
   the combinatorial logic component enabling the storage controller power enable line to override the processor power enable line and place the switch control line into the second state in an instance when the processor power enable line indicates that power should be provided to the plurality of memory cells.

2. The storage component as recited in claim 1, the plurality of memory cells comprising NAND cells.

3. The storage component as recited in claim 1, the combinatorial logic component comprising a logical OR gate.

4. The storage component as recited in claim 1, the storage component further comprising a memory cell I/O module and a storage controller I/O module providing an interface to communicate data between the plurality of memory cells and the storage controller, the output of the power switch being further coupled to hardware of the memory cell I/O module and hardware of the storage controller I/O module, the hardware of the memory cell I/O module and the hardware of the storage controller I/O module receiving power from the input power line in response to the switch control line having the first state, and the hardware of the memory cell I/O module and the hardware of the storage controller I/O module receiving no power from the input power line in response to the switch control line having the second state.

5. The storage component as recited in claim 4, the storage controller including multiple additional components coupled to an additional power line, the multiple additional components receiving power regardless of whether the switch control line has the first state or the second state.

6. The storage component as recited in claim 1, the plurality of memory cells including a first set of memory cells of a first type and a second set of memory cells of a second type, the power switch having an output to provide power from the input power line to the first set of memory cells in response to the switch control line having the first state, and to provide no power from the input power line to the first set of memory cells in response to the switch control line having the second state, the storage component further comprising:
   an additional combinatorial logic component, coupled to the storage controller and the processor, having as inputs the processor power enable line from the processor and another storage controller power enable line coupled to the storage controller, the additional combinatorial logic component having as an output an additional switch control line having the first state or the second state that is based on whether the processor power enable line is asserted and whether the another storage controller power enable line is asserted; and
   an additional power switch, coupled to the additional combinatorial logic component, having as an input an additional input power line and the additional switch control line, the additional power switch having an output to provide power from the additional input power line to the second set of memory cells in response to the additional switch control line having the first state, and to provide no power from the additional input power line to the second set of memory cells in response to the additional switch control line having the second state.

7. The storage component as recited in claim 6, the first type of memory cells and the second type of memory cells being implemented using different technologies.

8. The storage component as recited in claim 7, the first type of memory cells comprising NAND cells and the second type of memory cells comprising DRAM cells.

9. A method comprising:
   receiving, from an integrated circuit, an integrated circuit power enable signal indicating whether the integrated circuit determines that memory cells of a storage component are to be powered on;
   receiving, from a storage controller of the storage component, a storage controller power enable signal indicating whether the storage controller determines that the memory cells of the storage component are to be powered on, wherein the storage controller is configured to manage storage of data in the memory cells of the storage component and retrieval of data from the memory cells of the storage component;

in an instance when both the integrated circuit power enable signal and the storage controller power enable signal indicate that the memory cells are to be powered on, powering on the memory cells; and in another instance when the integrated circuit power enable signal indicates that the memory cells are to be powered on and the storage controller power enable signal indicates that the memory cells are to be powered off, overriding the integrated circuit power enable signal and powering off the memory cells.

10. The method as recited in claim 9, the method being implemented by a combinatorial logic component of the storage component.

11. The method as recited in claim 9, the powering on the memory cells comprising providing a switch control signal to a power switch to turn on the power switch to cause an input power to be provided to the memory cells.

12. The method as recited in claim 9, the powering off the memory cells comprising providing a switch control signal to a power switch to turn off the power switch to prevent an input power from being provided to the memory cells.

13. The method as recited in claim 9, the memory cells comprising NAND cells.

14. The method as recited in claim 9, the method further comprising:
in the another instance, causing the storage controller power enable signal to indicate that the memory cells are to be powered off based at least on a determination that a data request can be serviced from a cache of the storage component without powering on the memory cells.

15. The method as recited in claim 9, further comprising:
in the another instance, causing the storage controller power enable signal to indicate that the memory cells are to be powered off based at least on a determination that the storage component is performing maintenance on a mapping table that maps logical addresses to individual memory cells.

16. A system comprising:
a plurality of memory cells;
an integrated circuit having as an output an integrated circuit power enable signal;
a storage controller configured to manage storage of data in the plurality of memory cells and retrieval of data from the plurality of memory cells, the storage controller having as an output a first storage controller power enable signal;
a first logic component, coupled to the storage controller and the integrated circuit, having as inputs the integrated circuit power enable signal from the integrated circuit and the first storage controller power enable signal, the first logic component having as an output a first switch control line having a first state or a second state that is based on the integrated circuit power enable signal and the first storage controller power enable signal; and a first power switch, coupled to the first logic component, having as inputs a first input power line and the first switch control line, the first power switch having an output to provide power from the first input power line to the plurality of memory cells in response to the first switch control line having the first state, and to provide no power from the first input power line to the plurality of memory cells in response to the first switch control line having the second state, the first logic component being configured to enable the first storage controller power enable signal from the storage controller to override the integrated circuit power enable signal from the integrated circuit and place the first switch control line into the second state in an instance when the integrated circuit power enable signal indicates that power should be provided to the plurality of memory cells.

17. The system as recited in claim 16, the storage controller having as an additional output a second storage controller power enable signal, the plurality of memory cells including a first set of memory cells of a first type and a second set of memory cells of a second type, the first power switch having an output to provide power from the first input power line to the first set of memory cells in response to the first switch control line having the first state, and to provide no power from the first input power line to the first set of memory cells in response to the first switch control line having the second state, the system further comprising:
a second logic component, coupled to the storage controller and the integrated circuit, having as inputs the integrated circuit power enable signal and the second storage controller power enable signal, the second logic component having as an output a second switch control line having the first state or the second state that is based on the integrated circuit power enable signal and the second storage controller power enable signal; and
a second power switch, coupled to the second logic component, having as inputs a second input power line and the second switch control line, the second power switch having an output to provide power from the second input power line to the second set of memory cells in response to the second switch control line having the first state, and to provide no power from the second input power line to the second set of memory cells in response to the second switch control line having the second state.

18. The system as recited in claim 17, the first type of memory cells and the second type of memory cells being implemented using different technologies.

19. The system as recited in claim 17, the first input power line providing a different voltage than the second input power line.

20. The system as recited in claim 16, the plurality of memory cells comprising NAND cells.

* * * * *